Patented May 26, 1942

2,284,281

UNITED STATES PATENT OFFICE 2,284,281

SYNTHETIC RUBBERLIKE MATERIAL FROM 1 - CYANOBUTADIENE - 1,3 AND BUTADIENES-1,3

Bernard James Habgood, Elias Isaacs, and Leslie Budworth Morgan, Blackley, Manchester, England, assignors to Imperial Chemical Industries Limited, a corporation of Great Britain No Drawing. Application September 20, 1939, Serial No. 295,839. In Great Britain September 22, 1938

11 Claims. (Cl. 260—86)

This invention relates to improvements in the manufacture and application of new synthetic rubber-like materials.

According to the invention we manufacture synthetic rubber-like materials by interpolymerising in aqueous emulsion a mixture of butadiene-1:3 or a homologue of butadiene-1:3 and 1-cyanobutadiene-1:3, the mixture containing a minor proportion of the latter.

Also according to the invention we vulcanise polymerized products obtained by the above process by subjecting them to a heat treatment in the presence of compounding ingredients.

By the inclusion of the 1-cyanobutadiene-1:3, synthetic rubber-like materials are obtained, which after vulcanisation have much greater resistance to oils and solvents than the corresponding materials obtained from the polymerisation of butadiene-1:3 itself or its homologues or from the interpolymerisation of these with styrene, esters of acrylic acid and many other substances which have been recommended. This resistance to oils and solvents is of the greatest importance in synthetic rubber-like materials because it is this resistance which provides them with their most important advantage over natural rubber. In addition to this high resistance to oils and solvents, the synthetic rubber-like materials of this invention are excellent in other respects such as elasticity, tensile strength, resistance to abrasion, resilience and ease of working. Further, the process of the invention takes place readily and gives good yields of the rubber-like products.

This invention does not exclude the use of minor proportions of other polymerisable substances, for example substances which are known to polymerise with butadiene-1:3, such as styrene, methyl methacrylate and acylonitrile. By minor proportions we mean proportions smaller than those of the butadiene-1:3 or its homologues or of the 1-cyanobutadiene-1:3. The proportions in which the substances to be polymerised are to be used will depend upon the proportions required in the resulting products, especially upon the degree of resistance to oils and solvents which is required. A useful improvement in resistance can be obtained with as low a proportion of 1-cyanobutadiene-1:3 as 5%, i. e. 5% of 1-cyanobutadiene-1:3 and 95% of butadiene-1:3. For a high degree of resistance, proportions of 20–40% of 1-cyanobutadiene-1:3 can be used.

The emulsification and polymerisation can be conveniently effected in a single technical operation if the ingredients of the mixture, including an emulsifying agent, are emulsified by agitating at the temperature at which polymerisation is to be effected and agitation then continued long enough for the necessary polymerisation to take place. Suitable emulsifying agents are cetyltrimethyl-ammonium bromide, cetyl p-dimethyl-aminobenzoate methosulphate, sodium cetyl sulphate, sodium isopropylnaphthalene-sulphonate, and other salts derived from long chain bases and inorganic or organic acids or from organic acids of high molecular weight and inorganic bases. Small proportions of one or more electrolytes e. g. acetic acid or acetic acid admixed with sodium acetate may be included in the polymerisation mixture. Other ingredients may be included in the mixture, namely, agents which are known to catalyse polymerisation such as organic and inorganic peroxides and agents which modify the course of the polymerisation such as carbon tetrachloride. The products of polymerisation are produced in latex-like form. They may be obtained in massive form by coagulating the latex, removing the liquor and washing and drying the coagulum. The coagulation may be effected by known methods e. g. by freezing or by the addition of sodium chloride, sodium hydroxide or ethyl alcohol, depending upon the emulsifying agent, which has been employed. Washing and drying may be effected on a rubber roller mill which is fitted with a device for washing.

The dry rubber-like materials may be compounded with for example, filling and/or reinforcing ingredients such as carbon black and zinc oxide and/or vulcanising agents, for example sulphur and vulcanisation accelerators. The compounded material may then be vulcanised by a heat treatment.

The following examples, in which parts are by weight, illustrate but do not limit the invention.

*Example 1*

30 parts of 1-cyanobutadiene-1:3, 45 parts of butadiene-1:3, 5 parts of carbon tetrachloride, 400 parts of water, 4 parts of cetyl p-dimethyl-aminobenzoate methosulphate and 22 parts of 6% acetic acid are enclosed in an autoclave and agitated for five days at 60° C. The resulting latex is coagulated by adding 100 parts of 8% aqueous sodium hydroxide solution and warming to about 40° C. The coagulum is washed and dried on a rubber-roller mill. A rubber-like material is obtained.

Example 2

The rubber-like material obtained in Example 1 is included in the following mixing:

| | Parts |
|---|---|
| Product of Example 1 | 100 |
| Gas black | 50 |
| Plasticiser | 4 |
| Stearic acid | 2 |
| Zinc oxide | 5 |
| Sulphur | 2 |
| Mercaptobenzthiazole | 1 |
| Phenyl-beta-naphthylamine | 1 |

The mix is vulcanised for one hour at 141° C. A vulcanisate is obtained which has a maximum tensile strength of about 200 kg./cm.$^2$ and an elongation at break of 400%. It does not swell when immersed in hot mineral oils and swells to less than 190% of its original volume when immersed in benzene.

Example 3

400 parts of water, 16 parts of cetyl-p-dimethyl-aminobenzoate methosulphate, 22 parts of 6% acetic acid, 5 parts of carbon tetrachloride, 25 parts of 1-cyanobutadiene-1:3 and 50 parts of butadiene-1:3 are subjected to the emulsification and polymerisation conditions described in Example 1 and the resulting latex coagulated and the coagulum washed and dried as in Example 1.

A good rubber-like material is obtained.

Isoprene or 2:3-diphethylbutadiene-1:3 may be used instead of butadiene-1:3 in the above process and similar results obtained.

Example 4

The rubber-like material of Example 3 is compounded and vulcanised in the manner described in Example 2.

The vulcanisate, on testing, shows a maximum tensile strength of 273 kg./cms., and when immersed in Diesel oil for 7 days at 70° C. showed a swelling of only 9% of the original volume. A similar vulcanisate obtained from polymerised 2-chlorobutadiene-1:3 showed a swelling under similar circumstances of 66%.

We claim:

1. Process for the manufacture of new synthetic rubber-like materials which comprises polymerizing, in aqueous emulsion, 1-cyanobutadiene-1,3 together with a member of the group consisting of butadiene-1,3, 2-methylbutadiene-1,3, and 2,3-dimethylbutadiene-1,3, the latter material being present in larger amounts than the former material.

2. Process for the manufacture of new synthetic rubber-like materials which comprises polymerizing, in aqueous emulsion, 1-cyanobutadiene-1,3 together with butadiene-1,3, the latter material being present in larger amounts than the former material.

3. Process for the manufacture of new synthetic rubber-like materials which comprises polymerizing, in aqueous emulsion, a mixture comprising from 5 per cent to 40 per cent 1-cyanobutadiene-1,3 and from 95 per cent to 60 per cent butadiene-1,3.

4. Process for the manufacture of new synthetic rubber-like materials which comprises polymerizing, in aqueous emulsion, a mixture comprising from 20 per cent to 40 per cent 1-cyanobutadiene-1,3 and from 80 per cent to 60 per cent butadiene-1,3.

5. A synthetic rubber-like material comprising a polymerization product of a mixture of 1-cyanobutadiene-1,3 and a member of the group consisting of butadiene-1,3, 2-methylbutadiene-1,3 and 2,3-dimethylbutadiene-1,3, the latter material being present in larger amounts than the former material.

6. A synthetic rubber-like material comprising a polymerization product of a mixture of from 5 per cent to 40 per cent 1-cyanobutadiene-1,3 and from 95 per cent to 60 per cent butadiene-1,3.

7. A synthetic rubber-like material comprising a polymerization product of a mixture of from 20 per cent to 40 per cent 1-cyanobutadiene-1,3 and from 80 per cent to 60 per cent butadiene-1,3.

8. Process for the manufacture of new synthetic rubber-like materials which comprises polymerizing, in aqueous emulsion, a mixture of from 5 per cent to 40 per cent 1-cyanobutadiene-1,3 and from 95 per cent to 60 per cent of a member of the group consisting of butadiene-1,3, 2-methylbutadiene-1,3, and 2,3-dimethylbutadiene-1,3, compounding and curing the rubber-like material thus obtained.

9. Process for the manufacture of new synthetic rubber-like materials which comprises polymerizing, in aqueous emulsion, a mixture of from 20 per cent to 40 per cent 1-cyanobutadiene-1,3 and from 80 per cent to 60 per cent butadiene-1,3, compounding and curing the rubber-like material thus obtained.

10. Cured synthetic rubber-like material wherein the rubber-like ingredient is a polymerization product of a mixture of from 5 per cent to 40 per cent 1-cyanobutadiene-1,3 and from 95 per cent to 60 per cent butadiene-1,3.

11. Cured synthetic rubber-like material wherein the rubber-like ingredient is a polymerization product of a mixture of from 20 per cent to 40 per cent 1-cyanobutadiene-1,3 and from 80 per cent to 60 per cent butadiene-1,3.

BERNARD JAMES HABGOOD.
ELIAS ISAACS.
LESLIE BUDWORTH MORGAN.